United States Patent
Polansky et al.

(10) Patent No.: US 9,357,321 B1
(45) Date of Patent: May 31, 2016

(54) SIGNAL PROCESSING BASED ON AUDIO CONTEXT

(71) Applicant: Amazon Technologies, Inc., Seattle, WA (US)

(72) Inventors: Stephen M. Polansky, Santa Clara, CA (US); Matthew P. Bell, Sunol, CA (US); Yuzo Watanabe, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/502,533

(22) Filed: Sep. 30, 2014

Related U.S. Application Data (63) Continuation of application No. 13/461,181, filed on May 1, 2012, now Pat. No. 8,886,524.

(51) Int. Cl.
*G10L 21/00* (2013.01)
*G10L 21/02* (2013.01)
*G10L 19/00* (2013.01)
*H04R 29/00* (2006.01)
*H04R 1/08* (2006.01)
*G10L 15/26* (2006.01)
*H04R 3/00* (2006.01)

(52) U.S. Cl.
CPC ............... *H04R 29/00* (2013.01); *G10L 15/26* (2013.01); *H04R 1/08* (2013.01); *H04R 3/002* (2013.01)

(58) Field of Classification Search
USPC .................................. 704/200–257, 270–504
See application file for complete search history.

(56) References Cited

U.S. PATENT DOCUMENTS

| | | |
|---|---|---|
| 5,485,462 A | 1/1996 | Helm et al. |
| 7,739,105 B2 | 6/2010 | Zeng |
| 7,742,609 B2 | 6/2010 | Yeakel et al. |
| 8,126,159 B2 | 2/2012 | Goose et al. |
| 2004/0098251 A1 | 5/2004 | Vainio et al. |
| 2004/0120361 A1 | 6/2004 | Yu et al. |
| 2010/0227643 A1 | 9/2010 | Yew et al. |

*Primary Examiner* — Jesse Pullias
(74) *Attorney, Agent, or Firm* — Sutherland Asbill & Brennan LLP (57) ABSTRACT

Described herein are systems, methods, and apparatus for determining audio context between an audio source and an audio sink and selecting signal profiles based at least in part on that audio context. The signal profiles may include noise cancellation which is configured to facilitate operation within the audio context. Audio context may include user-to-user and user-to-device communications.

20 Claims, 10 Drawing Sheets

SIGNAL PROCESSING BASED ON AUDIO CONTEXT

CROSS-REFERENCE TO RELATED APPLICATION(S)

This application is a continuation of U.S. Nonprovisional application Ser. No. 13/461,181 filed May 1, 2012, the entire disclosure of which is hereby incorporated by reference.

BACKGROUND

Speech provides a convenient way to exchange information. Speech may be exchanged in a variety of audio contexts such as between users, or between one or more users and a device such as a speech recognition system. Signals or data representative of the speech may be acquired by microphones in many environments. However, conventional systems may apply signal processing which is ill-suited for a particular audio context.

DETAILED DESCRIPTION

Microphones are used to transform sounds into signals suitable for processing, storage, transmission, and so forth. Microphones may be used in a variety of settings including, but not limited to, offices, industrial facilities, homes, and so forth. The microphones may be incorporated, installed, or otherwise used by a wide range of devices including cellular telephones, desk telephones, handheld radios, in-vehicle control and communication systems, and so forth.

An audio source provides sounds. The microphone generates an audio signal from that sound. The audio signal from the microphone may be processed using a signal profile, which may include one or more noise cancellation techniques, to form processed audio. This processing may be performed with an intention to improve clarity or suitability for a consumer or destination of the audio, also known as an "audio sink." Different signal profiles allow for different processing. An audio context is identified by a particular combination of audio source and audio sink. For example, a user-to-user audio context is one in which the audio source and the audio sink are both human users. Similarly, a user-to-device audio context is one in which the audio source is a human user, and the audio sink comprises a device such as a computer performing speech recognition functions. In some implementations, the audio context may also be determined at least in part by the connection between the audio source and the audio sink. For example, the audio context may be different for communication between two users via a cellular telephone call as compared to a voice over internet protocol connection.

This disclosure describes systems, methods, and apparatus for selecting signal profiles for processing audio signals based at least in part on an audio context. A particular signal profile may be selected which corresponds to processed audio suited for use by the audio sink. For example, in a user-to-machine audio context, the audio signal may be processed such that frequencies of particular use to a speech recognition system are preserved while providing noise cancellation.

Illustrative System

Figure 1:
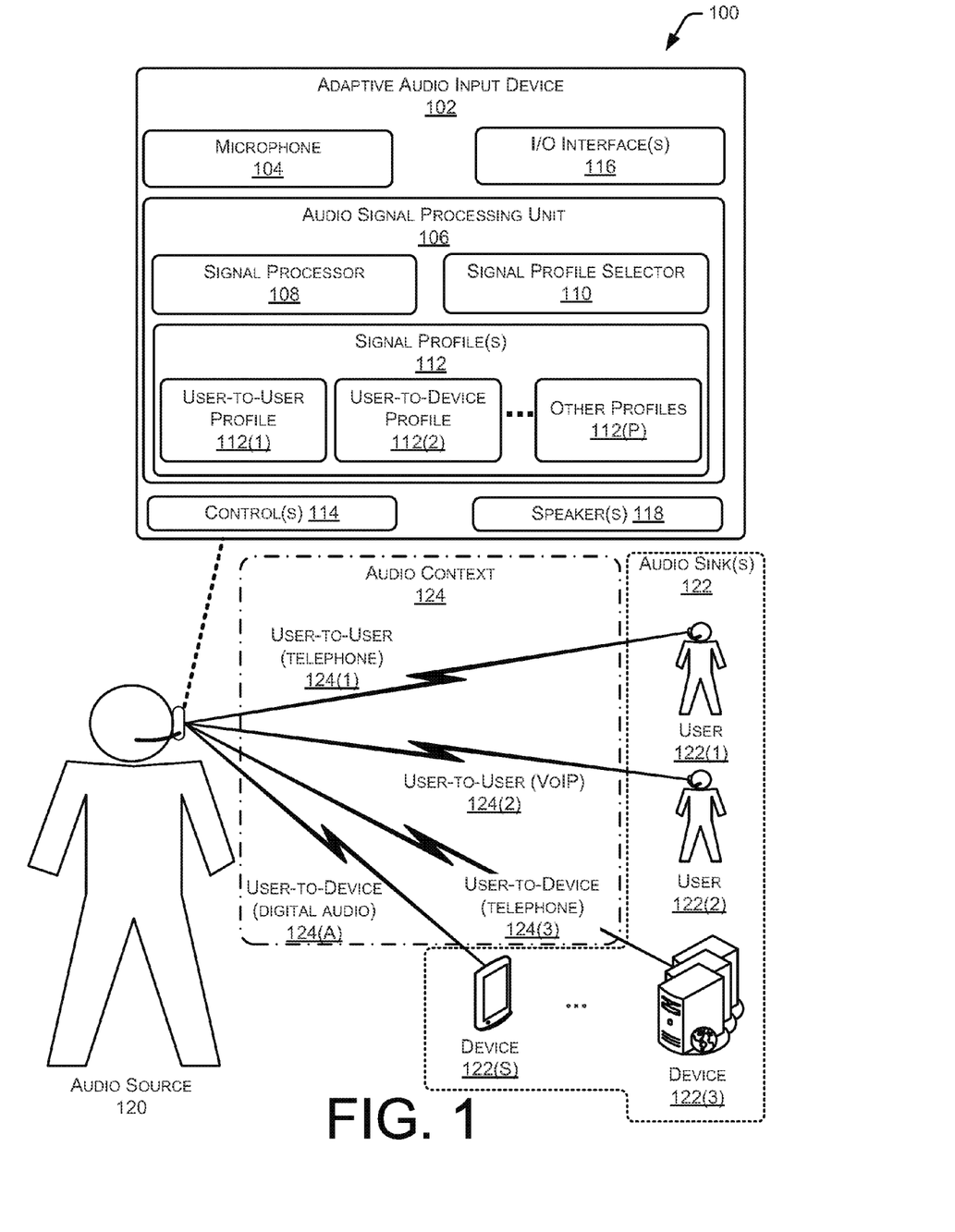
FIG. 1 illustrates a system for selecting signal processing based at least in part on an audio context in accordance with an embodiment of the disclosure.

FIG. 1 illustrates a system 100 for selecting signal processing based at least in part on an audio context. An adaptive audio input device 102 is depicted. The audio input device 102 may include, or be coupled to, one or more microphones 104. The microphone 104 is a transducer or sensor configured to convert sound into a signal. The microphone 104 may utilize a condenser, carbon, piezoelectric, laser, liquid, microelectromechanical, or other detectors to generate an electrical, optical, or magnetic signal at least partly in response to impinging sound.

The microphone 104 is coupled to an audio signal processing unit 106. The audio signal processing unit 106 may comprise a signal processor 108, a signal profile selector 110, and one or more signal profiles 112. The signal processor 108 may comprise analog, digital, or mixed analog and digital devices configured to accept an audio signal provided by the microphone 104 and provide processed audio. In one implementation, the signal processor 108 may comprise a digital signal processor ("DSP") configured to provide several signal profiles, several analog filter networks, and so forth.

The signal profile selector 110 is configured to determine a signal profile for use in processing the audio signal provided by the microphone 104. The determined signal profiles 112 may include a user-to-user signal profile 112(1), a user-to-device signal profile 112(2), or other profiles 112(P). As used herein, letters enclosed by parenthesis such as "(P)" indicate an integer having a value greater than or equal to zero. The signal profiles 112 may comprise data stored in a computer-readable storage medium, may comprise analog circuitry, or a combination thereof. For example, where the signal processor 108 comprises a DSP, the signal profiles 112 may comprise instructions or configuration files configured to produce particular processed audio. The profiles are discussed below in more detail.

The signal profile selector 110 may be configured to determine an audio context, or receive audio context information. This determination may be automatic, manual, or a combination thereof. For example, the signal profile selector 110 may be configured as described below such that when the audio sink is a human, a user-to-user signal profile 112(1) is used to generate the processed audio. In another example, a user may use a control 114 or other input, such as speech recognized by a speech recognition device, to indicate a particular audio context.

The control 114 may comprise a switch, a proximity sensor, or other device configured to receive a user input from a touch, a gesture, and so forth. The control 114 may be coupled to the signal profile selector 110 such that activation of the control 114 or other input device changes the audio context of the audio signal processing unit 106. For example, a user may touch a button on a headset to indicate that he/she will be transitioning from a telephone call with a human, who may use an associated the user-to-user signal profile 112(1) to a machine-provided speech recognition system associated with the user-to-device signal profile 112(2).

An input/output ("I/O") interface 116 provides a coupling to other devices or portions of the adaptive audio input device 102. The I/O interface may include, but is not limited to, a personal area network ("PAN") interface, a wireless local area network ("WLAN") interface, wired interface, digital audio interface, analog audio interface, and so forth. For example, in one implementation, the I/O interface 116 may comprise a PAN connection implementing the Bluetooth™ protocol as promulgated by the Bluetooth Special Interest Group in Kirkland, Wash. The I/O interface 116 may utilize acoustic, radio frequency, optical, electrical, or other signals to exchange data between at least a portion of the adaptive audio input device 102 and another device or component thereof.

In some implementations, the adaptive audio input device 102 may comprise other components such as a speaker 118, global positioning system unit, an accelerometer, and so forth. In some implementations, the adaptive audio input device 102 may be implemented as a headset, an earpiece, and so forth.

The various elements within the adaptive audio input device 102 are described above by way of illustration and not as a limitation. In other implementations, the various elements may be distributed in other devices. For example, the microphone 104 and the I/O interface 116 may be in a single enclosure, while the audio signal processing unit 106 may be in another enclosure.

Illustrated here is an audio source 120. This audio source 120 may comprise a human user, another device, a natural or non-natural phenomena, and so forth. In this illustration, the audio source 120 is depicted as a person. The audio source 120 is coupled to one or more audio sinks 122. These audio sinks 122 are consumers or destinations of the audio. The audio sinks 122 may comprise other human users or devices such as a speech recognition device, a recording device, and so forth. The audio context 124 is determined based at least in part on the audio source 120 and the audio sink 122. In some implementations, the audio context 124 may also be determined based at least in part upon the connection between the audio source 120 and the audio sink 122, on ambient noise detected at the audio source 120, or a combination thereof. For example, the signal profiles 112 may vary based on the available signal bandwidth such that one signal profile may be used during a cellular telephone connection and another for a voice-over-internet-protocol ("VOIP") connection. In another example, a particular type of ambient noise present at the audio source 120 may be associated with a particular audio context 124.

By way of illustration, and not as a limitation, four audio contexts 124(1)-(A) are shown here. A user-to-user via telephone connection audio context 124(1) is a shown. With this context, the audio source 120 is a person speaking via a telephone connection to the audio sink 122(1) who is another user. In this context, the signal profile selector 110 may select the user-to-user signal profile 112(1), configured to provide for noise cancellation and other audio processing appropriate for human conversation. In some implementations, the connection may also be referred to as a "channel."

Another user-to-user connection via a VOIP connection audio context 124(2) is shown between the audio source 120 and another user 122(2). This audio context is also user-to-user and, given the VOIP connection, may provide a higher bandwidth and wider range of available frequencies, compared to a lower bandwidth telephony connection. Thus, the signal profile selector 110 may select another user-to-user signal profile 112 appropriate for this connection.

When the audio source 120 is connected via a telephone connection to an audio sink 122(3), which is device, a user-to-device audio context 124(3) is determined. For example, the audio source 120 user may be providing speech to a speech recognition device as part of an interactive voice response system which is configured to convert at least a portion of the speech into text or commands. For this user-to-device audio context 124(3), the user-to-device signal profile 112(2) may be selected by the signal profile selector 110. By selecting the user-to-device signal profile 112(2), the performance of the audio sink 122(3) device is improved. For example, noise cancellation techniques suitable for use in the user-to-user audio context may result in unacceptable loss of data which is usable by the device. By changing the signal profile and generating the processed audio, accuracy of the device 122(3) may be improved.

The audio source 120, by way of the adaptive audio input device 102, may also provide audio to other audio sink 122(S) devices. For example, the audio sinks may comprise laptops, netbooks, desktop computers, servers, smartphones, navigation systems, entertainment systems, telephones, hearing aids, and so forth. A user-to-device audio context 124(A) may thus be determined between the audio source 120 and the audio sink 122(S) device. For example, the adaptive audio input device 102 may comprise a Bluetooth™ headset coupled via a wireless connection to a smartphone device. The communication between the audio source 120 and the audio sink 122 may be analog, digital, or a combination thereof. For example, the adaptive audio input device 102 may be coupled to the audio sink 122 device via an analog audio cable.

While the adaptive audio input device 102 and associated audio context are described with respect to a single audio context and a single audio sink, in some implementations multiple audio contexts may exist in conjunction with additional audio sinks. For example, the audio source 120 user may be speaking to another user over a VOIP connection, but also have the audio processed by a speech recognition device to generate a transcript. Where multiple audio sinks 122 are present, the adaptive audio input device 102 may provide a plurality of processed audio streams where each stream is processed by a different signal profile 112, or may provide a single processed stream selected to meet at least some of the parameters of the audio sinks 122. Continuing the example, the user-to-user signal profile 112(1) may be used, or modified, to provide the additional frequencies called for by the speech recognition device. Thus, the signal profile selector 110 may be configured to select a profile which satisfies at least a portion of the needs of a plurality of audio sinks 122.

Figure 2:
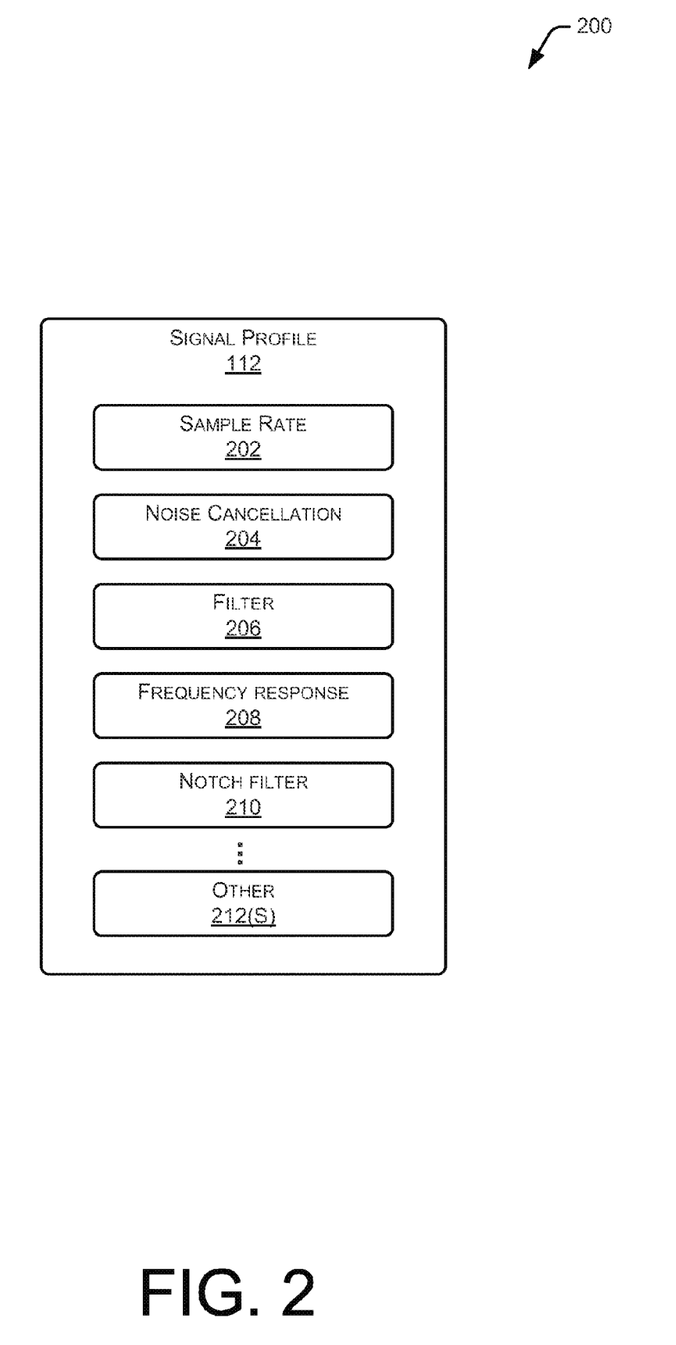
FIG. 2 illustrates a block diagram of a signal profile in accordance with an embodiment of the disclosure.

FIG. 2 illustrates a block diagram 200 of the signal profile 112. The signal profile 112 may be implemented as discrete analog hardware, discrete digital hardware, one or more DSPs and associated instructions for configuring the DSP operation, or a combination thereof. The signal profile 112 determines how an audio signal as received by the microphone 104 is manipulated to produce processed audio. As described above, the signal profile selector 110 is configured to select a particular signal profile 112 which corresponds to a particular audio context 124. The signal profile 112 may incorporate or otherwise embody one or more of the following characteristics or operations.

A sample rate 202 may be specified, indicating a frequency at which the audio signal is sampled. For example, the signal profile 112 associated with a user-to-user audio context via telephone may specify a sample rate of 8 kHz, given that the telephone system will not support data generated by higher sampling rates. In comparison, user-to-user audio context using VOIP may have a sample rate of 16 kHz.

Noise cancellation 204 circuitry or processing may be specified. Noise cancellation techniques may process a signal to reduce ambient or background noises, emphasize human speech, and so forth. For example, noise cancellation may be used to reduce wind noises, attenuate background sounds, and so forth. Noise cancellation techniques may be tailored for audio sinks such as human users or devices. Such tailoring provides for improved results in intelligibility or usability by humans or devices. For example, high and low audio frequencies may be attenuated or removed for noise cancellation in a user-to-user audio context, which maintains human intelligibility. However, the same noise cancellation may render the same speech unintelligible to a device such as a speech recognition system.

One or more filters 206 may be specified for a given signal profile 112. For example, a high-pass filter may be used to reduce low frequency noise. These filters may be used in conjunction with, or as part of, the noise cancellation 204.

The signal profile 112 may define a particular frequency response 208. The frequency response 208 may be configured to provide amplification or attenuation to particular bands in the audio signal. For example, the frequency response 208 of the signal may be adjusted to amplify mid-range sounds.

A notch filter 210 may be defined and used during processing of the audio signal. For example, a notch filter 210 may be configured to remove a 120 Hertz [noise?] generated by a piece of machinery, such as an air conditioner.

The signal profile 112 may specify other 212(S) characteristics or operations. For example, the signal profile 112 may configure dynamic range compression, automatic gain control, and so forth.

Figure 3:
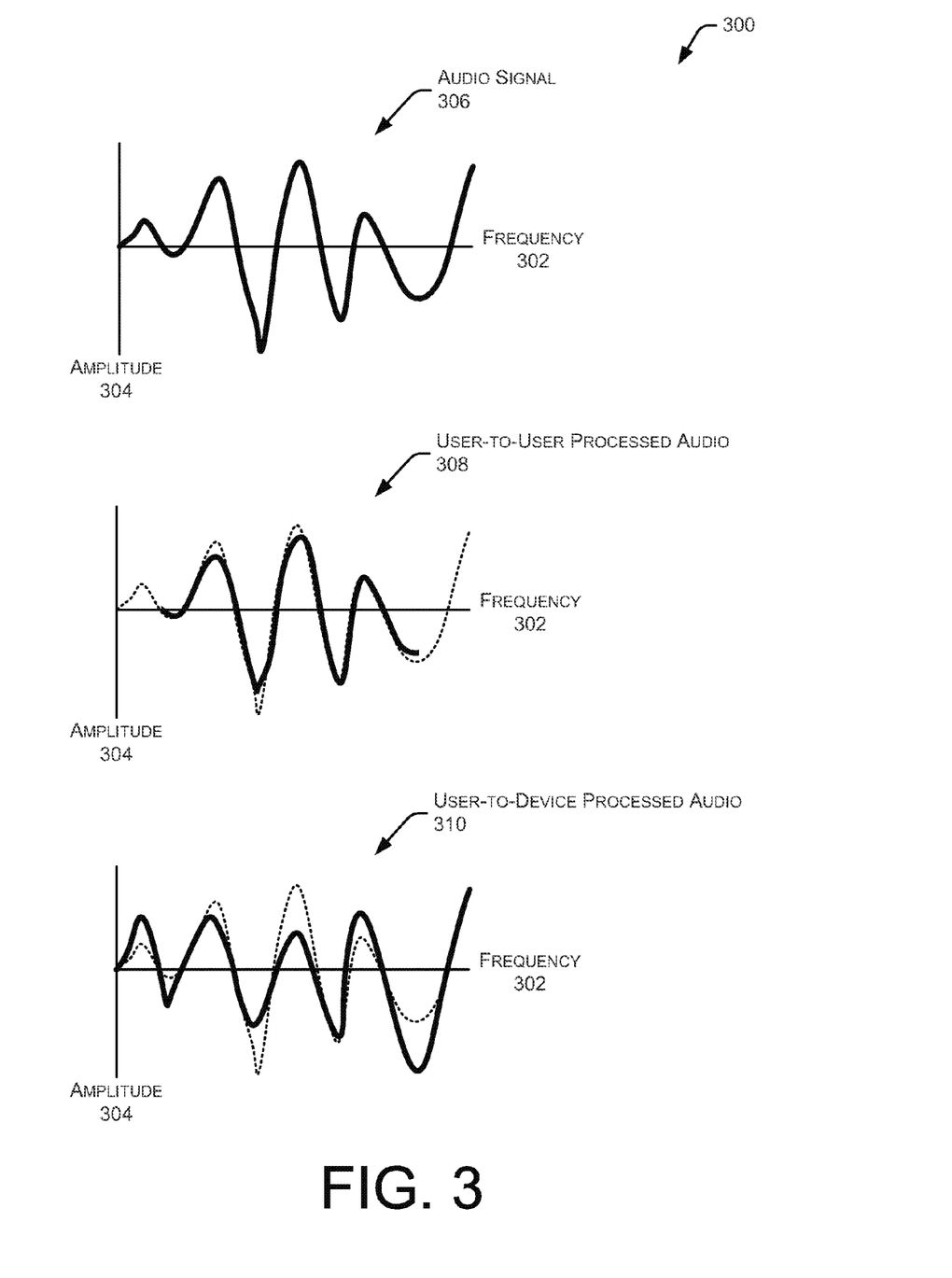
FIG. 3 illustrates an audio signal as processed with a user-to-user signal profile, and the audio signal as processed with a user-to-machine signal profile in accordance with an embodiment of the disclosure.

FIG. 3 illustrates several audio signals 300 and how they may be processed by the signal processor 108 using a particular signal profile 112. In this illustration, frequency 302 is indicated on a horizontal axis while amplitude 304 is indicated on a vertical axis.

At audio signal 306, a waveform at an instant in time of a "raw" or original audio signal is shown. This is the signal which is generated by the microphone 104. This original audio signal is shown in the following waveforms 308 and 310 as a broken line.

At user-to-user processed audio 308, the original audio signal 306 as processed using the user-to-user signal profile 112(1) is shown. As described above, the user-to-user signal profile 112(1) may omit or attenuate frequencies below and above certain frequencies. As shown here, a section of low and high frequencies have been removed by the processing with the user-to-user signal profile 112(1). Also, as part of the processing, some peaks in the waveform have been attenuated. The user-to-user signal profile 112(1) may thus be configured to provide intelligibility for human users.

At user-to-device processed audio 310, the original audio signal 306 as processed using the user-to-device signal profile 112(2) is shown. As described above, the user-to-device signal profile 112(2) is configured to improve intelligibility by the audio sink 122 [is this correct?] which is a device. Here, the processed audio has been manipulated such that it may be unintelligible to a human user. However, the device may be configured to determine intelligibility using the higher and lower frequencies which have been included and amplified in the processed audio.

Figure 4:
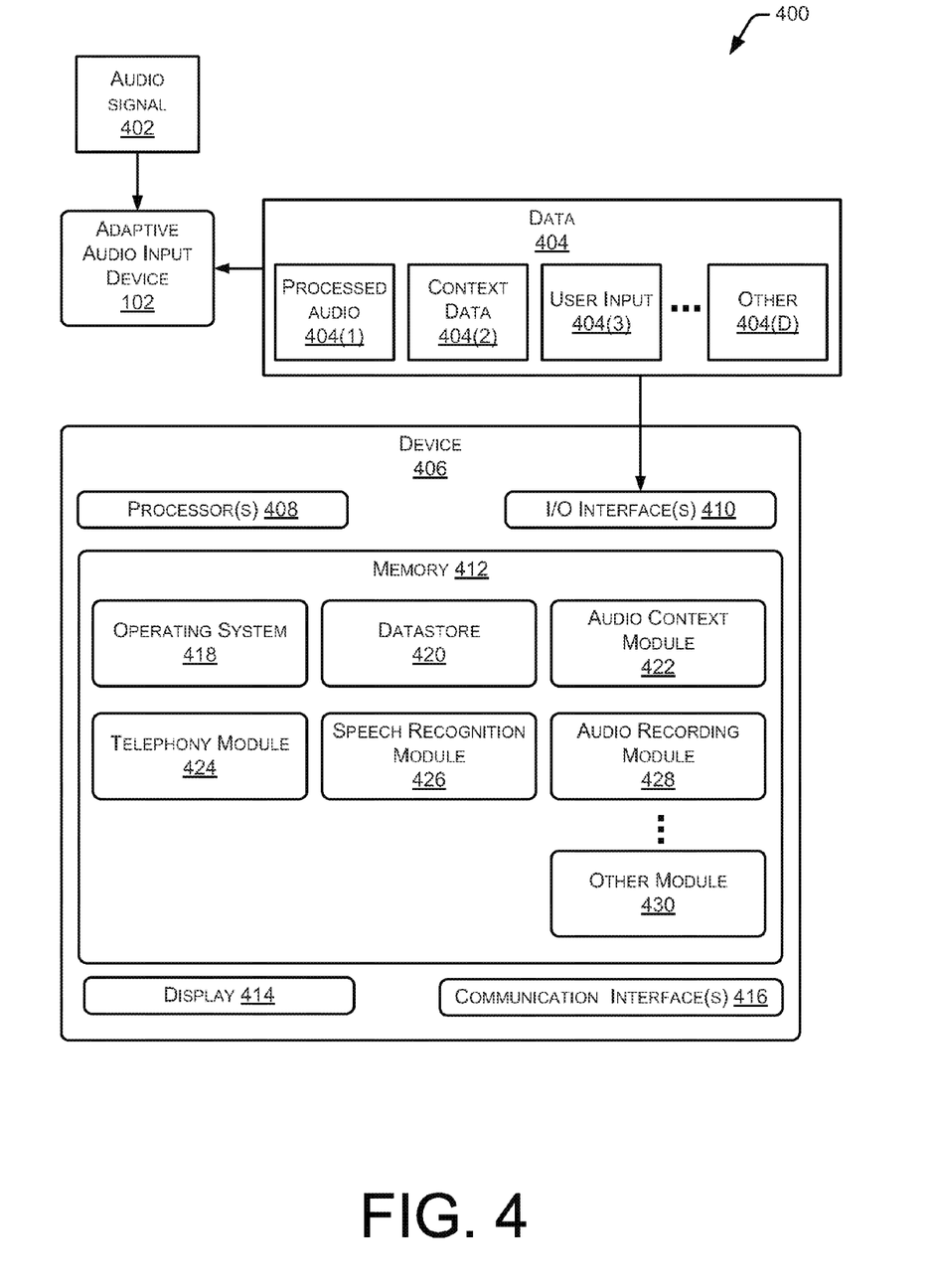
FIG. 4 illustrates a block diagram of a device configured as an audio sink in accordance with an embodiment of the disclosure.

FIG. 4 illustrates a block diagram of a device configured as an audio sink. As described above, the audio sinks 122 may comprise laptops, netbooks, desktop computers, servers, smartphones, navigation systems, entertainment systems, telephones, hearing aids, instructions, or applications executing on these devices, and so forth.

An audio signal 402 generated by an audio source 120 is received by the adaptive audio input device 102. The adaptive audio input device 102 is configured to exchange data 404 with a device 406. The data 404 may comprise processed audio 404(1), audio context data 404(2), user input 404(3), and other data 404(D) such as audio for presentation on the speaker 118.

The device 406 may comprise one or more processors 408, one or more I/O interfaces 410, one or more memories 412, one or more displays 414, and one or more communication interfaces 416. The one or more processors 408 may comprise one or more cores and are configured to access and execute at least in part instructions stored in the one or more memories 412.

The one or more I/O interfaces 410 are configured to allow for coupling devices, such as the adaptive audio input device 102, as well as keyboards, joysticks, touch sensors, cameras, microphones, speakers, haptic output devices, external memories, and so forth, to the device 406. The I/O interfaces 410 may include a wireless PAN interface, a wired connector, and so forth. The I/O interfaces 410 may be coupled to the one or more processors 408, the one or more memories 412, and so forth.

The device 406 may comprise the one or more displays 414 configured to present visual information to users. The display 414 may comprise a reflective or emissive display configured to present images, which appear to be two- or three-dimensional to the user. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 414 may be configured to present images in monochrome, color, or both. In some implementations, the display 414 of the device 406 may use emissive, reflective, or combination displays with emissive and reflective elements.

The one or more communication interfaces 416 may provide for the transfer of data between the device 406 and another device directly such as in a peer-to-peer fashion, via a network, or both. The communication interfaces 416 may include, but are not limited to, personal area networks ("PANs"), wired local area networks ("LANs"), wireless local area networks ("WLANs"), wireless wide area networks ("WWANs"), telephone network interfaces, cellular telephone interfaces, and so forth. The communication interfaces 416 may utilize acoustic, radio frequency, optical, or other signals to exchange data between the device 406 and another device such as an access point, a host computer, a router, a reader device, another device 406, and the like.

The one or more memories 412 comprise one or more computer-readable storage media ("CRSM") or other memory device. The one or more memories 412 may include, but are not limited to, random access memory ("RAM"), flash RAM, magnetic media, optical media, and so forth. The one or more memories 412 may be volatile in that information is retained while power is applied or non-volatile in that information is retained without providing power.

The one or more memories 412 may store instructions for execution by the one or more processors 408 to perform certain actions or functions. These instructions may include an operating system 416 configured to manage hardware resources such as the I/O interfaces 410 and display 414, and provide various services to applications executing on the one or more processors 408. The one or more memories 412 may also store a datastore 420 containing information about the operating system, signal profiles, configuration files, and so forth.

An audio context module 422 may be present in the one or more memories 412. The audio context module 422 may be configured to determine the audio context 124. This determination may be manual, automatic, or a combination thereof. Manual determination may include receiving user input 404(3) such as a signal from a button press of the control 114 on the adaptive audio input device 102. Automatic determination may include determining the audio context based at least in part on the audio source 120, the audio sink 122, the connection between the source and sink, the ambient noise detected at the source, or a combination thereof.

The audio context module 422 may also be configured to send or receive audio context data 404(2). The audio context data 404(2) may be generated or received by the audio context module 422. For example, the device 406 may generate audio context data 404(2) based on the audio sink 122 selected, and send that audio context data 404(2) to the adaptive audio input device 102. The signal profile selector 110 may use that audio context data 404(2) to select a particular signal profile 112.

The audio context module 422 may also receive audio context data 404(2). For example, the adaptive audio input device 102 may provide data indicating the audio context 124 used during processing of the audio, information about the signal profile 112 used, and so forth. The audio context module 422 may be configured to modify how processed audio 404(1) is used, at least partly in response to the received audio context. For example, processed audio, which has a user-to-device audio context 124(3), may be directed to a particular application or module.

The modules may be configured to use audio context 124 to adjust their processing of processed data. For example, where the audio context 124 is user-to-user but the processed audio is also used by the speech recognition module 426, the speech recognition module 426 may use a different process to recognize speech as compared to when the user-to-device signal profile 112(2) is permitted.

The device 406 may also include a telephony module 424. This module may be configured to couple to one or more of the communication interfaces 416 to provide telephony functionality. This may include placing and sending calls via the public-switched telephone network, using VOIP, and so forth. For example, the telephony module 424 may be configured to initiate or receive cellular telephone calls.

A speech recognition module 426 may be configured to recognize human speech and generate text based at least in part on that speech. For example, the speech recognition module 426 may be configured to accept the processed audio and generate a written transcript. The speech recognition module 426 may also be configured to accept input from the user via speech. For example, the user audio source 120 may issue voice commands to initiate a telephone call using the telephony module 424.

An audio recording module 428 may be configured to receive the processed audio and store at least a portion of it within the one or more memories 412. For example, the user may wish to record a speech. In this example, the audio source 120 comprises the human user making the speech, and the audio recording module 428 is configured to store this audio.

Other modules 430 may also be present. For example, a text-to-speech module may be configured to accept data and output an audio stream. This audio stream may be processed or generated based at least in part on the audio context 124 and an associated signal profile such as a device-to-user profile 112(3) [user-to-device signal profile 112(2)?].

Figure 5:
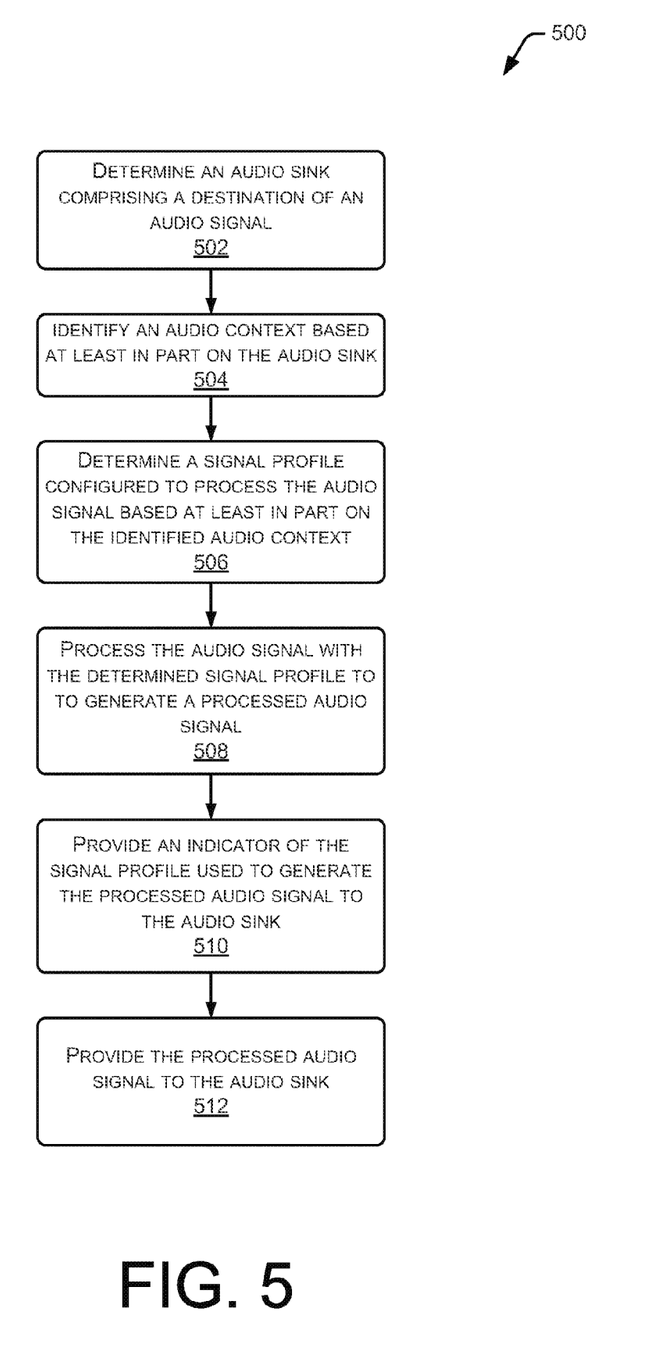
FIG. 5 illustrates a flow diagram of a process of providing audio processed with a signal profile associated with the audio context in accordance with an embodiment of the disclosure.

FIG. 5 illustrates a flow diagram 500 of a process of providing audio processed with the signal profile 112 associated with the audio context 124. In some implementations, the following process may be implemented by the adaptive audio input device 102, the device 406, or a combination thereof.

Block 502 determines an audio sink 122 comprising a destination of the audio signal. This determination may be based at least in part on a module designated to receive processed audio. For example, activation of the telephony module 424 may result in a determination that the audio sink 122 is another user on the other end of a telephone connection made. As described above, the audio sink 122 may comprise a telephony device, a device configured to provide speech recognition, a recording device, and so forth. In some implementations, a plurality of audio sinks 122 may be present, and processed audio may be provided to these audio sinks 122 concurrently or contemporaneously.

Block 504 identifies an audio context 124 based at least in part on the audio sink 122. For example, the audio context 124 may be expressed as a relationship between the audio source and the audio sink. For example, a user-to-user interaction between two or more users or a user-to-device interaction between one or more users and one or more devices. The audio context 124 may be based at least in part on the audio source 120, the audio sink 122, the connection between the source and sink, or a combination thereof. Continuing the previous example, given that a telephone call is in progress, the audio context 124 may be determined to be user-to-user. In some implementations, the audio context 124 may comprise a user-to-user audio context, a user-to-device audio context, device-to-user context, or a combination thereof. In other implementations, the audio context 124 may be identified using a connection type or a connection between the audio source 120 and the audio sink 122. For example, available bandwidth, the nature of the connection, and so forth may be used at least in part to identify audio context 124.

Block 506 determines a signal profile 112 configured to process the audio signal based at least in part on the identified audio context 124. For example, the signal profile selector 110 may determine that when the audio context 124 is user-to-user, the user-to-user signal profile 112(1) may be selected for use. In some implementations, two or more audio sinks 122 may be utilizing the processed audio. In these situations, a single signal profile 112 may be associated which supports the two or more audio sinks 122. In another implementation, separate signal profiles 112 may be selected to correspond with each of the audio sinks 122.

Block 508 processes the audio signal with the determined signal profile 112 to generate a processed audio signal. For example, the audio signal from the microphone 104 may be processed by the signal processor 108 using the determined signal profile 112. In some implementations, applying the determined signal profile may comprise selecting a noise cancellation mode based on the identified audio context. As described above, applying the determined signal profile may comprise configuring a digital signal processor, such as the signal processor 108, to process the audio signal, or selecting analog processing circuitry to process the audio signal.

In one implementation where two or more audio sinks 122 are using the processed audio, multiple signal profiles 112 may be applied to the audio signal. As a result, multiple processed audio streams may be generated, each designated for the associated audio sink 122. For example, a first processed audio stream processed with the user-to-user signal profile 112(1) may be generated and sent to the user 122(1) while a second processed audio stream processed with the user-to-device signal profile 112(2) is generated and sent to the device 122(3).

Block 510 provides an indicator of the signal profile 112 used to generate the processed audio to the audio sink 122. This indicator may comprise a flag, a bit, a file, and so forth configured to indicate the signal profile 112 used. For example, the processed audio 404(1) from the adaptive audio input device 102 may include data indicating the signal profile 112. In some implementations, such as where the signal processor 108 comprises a DSP, the indicator may include instructions associated with the signal profile 112.

Block 512 provides the processed audio to the audio sink 122. For example, the processed audio 404(1) may be may sent to the device 122(3).

Figure 6:
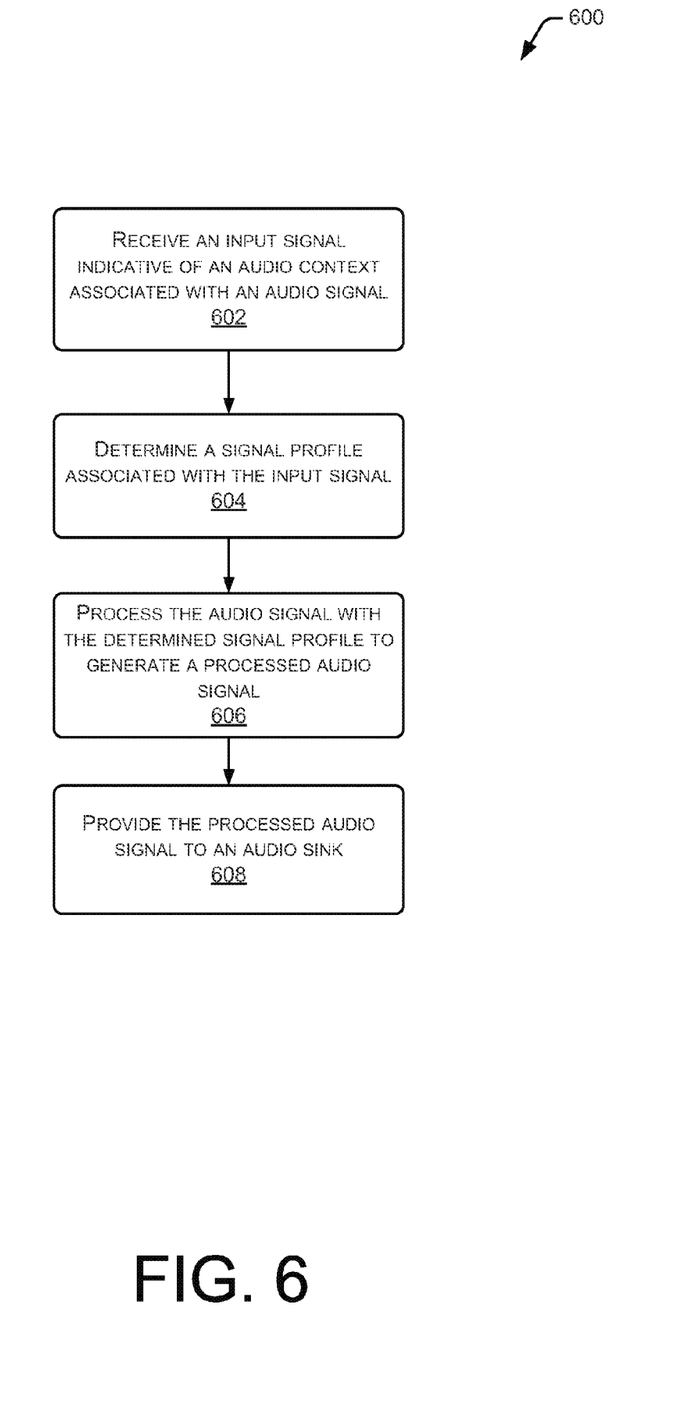
FIG. 6 illustrates a flow diagram of a process of selecting a signal profile based at least in part on an input signal in accordance with an embodiment of the disclosure.

FIG. 6 illustrates a flow diagram 600 of a process of selecting a signal profile based at least in part on an input signal. In some implementations, the following process may be implemented by the adaptive audio input device 102, the device 406, or a combination thereof.

Block 602 receives an input signal indicative of an audio context associated with the audio signal. As described above, in one implementation, this input signal may be generated by the control 114. The control 114 may comprise an input switch on the adaptive audio input device 102, and the input signal may comprise a signal generated at least in part by activation of the switch. For example, during use, the audio source 120 user may press the control 114 to indicate a change in the audio context 124. In another example, the control 114 may be configured to initiate a function such as placing a telephone call, initiating VOIP communications, and so forth. The function may be associated with a change in audio context.

In another implementation, the input signal may comprise a voice command in the audio signal as processed by the speech recognition module 426. For example, a particular spoken word may be used to indicate a change in the audio context 124. In other implementations, other sounds may be used such as a finger snap, a whistle, and so forth. This input signal may also be configured to initiate a function such as placing a telephone call, initiating VOIP communications, and so forth.

Block 604 determines a signal profile 112 associated with the input signal. For example, where the input signal comprises the spoken words "phone call," the signal profile selector 110 may select the user-to-user signal profile 112(1).

Block 606 configures the signal processor 108 to process the audio signal with the determined signal profile 112 to generate a processed audio signal. For example, where the signal processor 108 comprises a DSP, a configuration file stored in the one or more memories 412 may be loaded into the DSP.

Block 608 provides the processed audio signal to an audio sink 122. For example, the processed audio 404(1) may be sent to the device 406 via a wireless PAN I/O interface 410.

Figure 7:
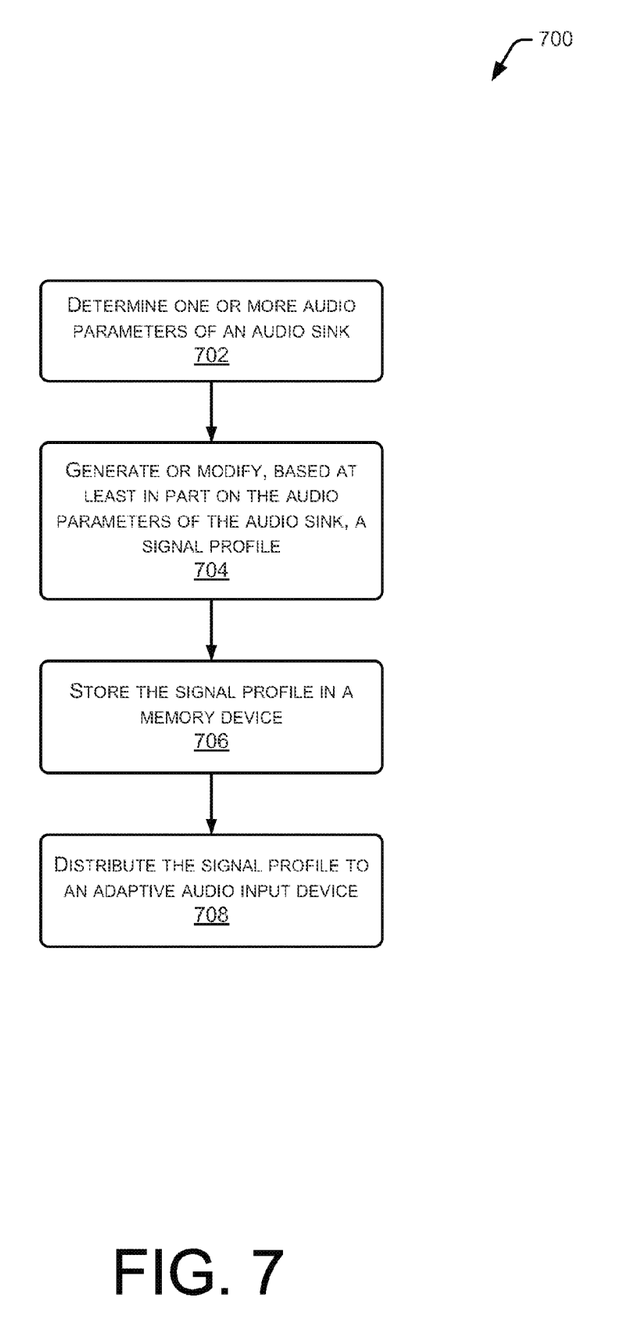
FIG. 7 illustrates a flow diagram of a process of generating a signal profile in accordance with an embodiment of the disclosure.

FIG. 7 illustrates a flow diagram 700 of a process of generating a signal profile 112. The signal profiles 112 may be generated manually, automatically, or by a combination thereof. Signal profiles may be generated to account for new audio contexts 124, such as when the adaptive audio input device 102 is to provide processed audio for a new device via a new connection, is used in a new environment, and so forth. By generating signal profiles 112 appropriate to the audio context, performance or intelligibility at the audio sink 122 may be improved. In some implementations, the following process may be implemented by the adaptive audio input device 102, the device 406, or a combination thereof.

Block 702 determines one or more audio parameters of an audio sink 122 configured to receive an audio signal. The one or more audio parameters may comprise one or more frequency bands which are reproducible by one or more speakers of the audio sink during presentation of the processed signal. The one or more audio parameters may also comprise frequency response as affected by noise cancellation, and so forth. For example, the audio sink 122 may call for a particular sample rate, frequency response, type of noise cancellation to apply, and so forth. The one or more audio parameters may be determined experimentally, manually, or a combination thereof. As described above, in one implementation, the audio sink 122 may comprise a device configured to present audio to a human. In another implementation, the audio sink may comprise a device.

Block 704 generates or modifies, based at least in part on the audio parameters of the audio sink, a signal profile 112 configured for processing the audio signal on a signal processor to generate a processed audio signal. In some implementations, an existing signal profile 112 may be modified. The signal profile 112 may comprise a set of instructions configured to perform operations on a DSP, or for selection of particular analog circuitry, and so forth. In another implementation, the signal profile 112 may comprise hardware description language instructions for configuring a field programmable gate array ("FPGA") or other reconfigurable device.

Block 706 stores the signal profile 112 in a memory device. For example, in one implementation, this may be the one or more memories 412 of the device 406.

Block 708 distributes the signal profile 112 to one or more adaptive audio input devices 102 configured to process an audio signal with the signal profile 112. For example, the generated signal profile 112 may be provided to the adaptive audio input device 102 via the I/O interface 116.

Figure 8:
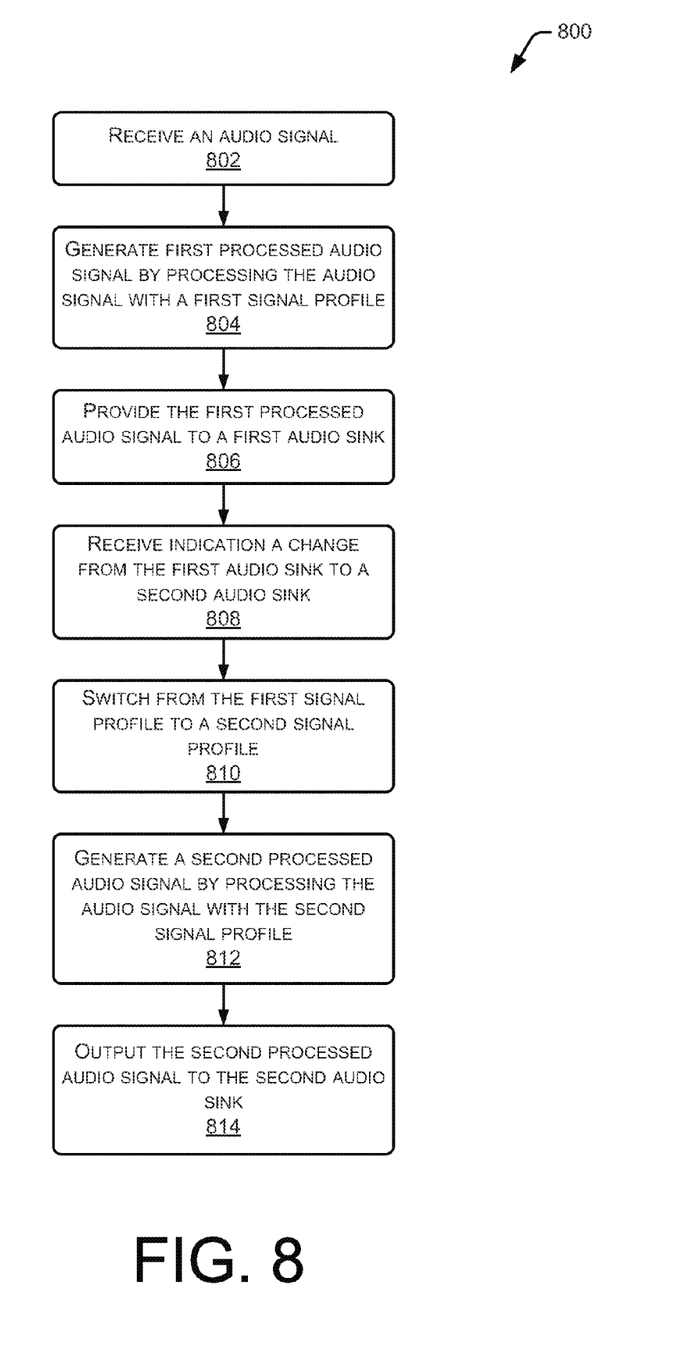
FIG. 8 illustrates a flow diagram of a process of changing signal profiles in response to a change in audio context in accordance with an embodiment of the disclosure.

FIG. 8 illustrates a flow diagram 800 of a process of changing signal profiles in response to a change in audio context. In some implementations, the following process may be implemented by the adaptive audio input device 102, or a portion thereof.

Block 802 receives an audio signal, such as the audio signal generated by the microphone 104. Block 804 generates first processed audio signal by processing the audio signal with a first signal profile 112. For example, the first signal profile 112 may be the user-to-user signal profile 112(1) suited for use when the audio context 124(1) is user-to-user.

Block 806 provides the first processed audio signal to a first audio sink 122. Continuing the example, the first processed audio signal may be sent to the audio sink 122(1), such as a cellular telephone.

Block 808 receives indication of a change from the first audio sink to a second audio sink. Because the relationship between the audio source has changed from the first audio sink to the second audio sink, the audio context has changed. In some implementations, the indication of the audio context change may comprise an input received from the control 114, a voice command, and so forth. Continuing the example, the audio source 120 user may indicate by pressing a button on his/her adaptive audio input device 102 that the user wants to provide audio to the speech recognition module 426.

Block 810, at least partly in response to the indication of an audio context change, switches from the first signal profile 112 to a second signal profile 112. For example, the signal profile selector 110 transitions the signal processor 108 from utilizing the user-to-user signal profile 112(1) to the user-to-device signal profile 112(2).

Block 812 generates a second processed audio signal by processing the audio signal with the second signal profile 112. Continuing the example, the signal processor 108 may provide the second processed audio signal using the user-to-device signal profile 112(2).

Block 814 outputs the second processed audio signal to the second audio sink. As described above, the signal profiles 112 may be configured to provide processed audio configured to facilitate processing by the respective audio sinks 122. Continuing the example, the second processed audio may be provided to the speech recognition module 426. Performance of the speech recognition module 426 may be improved by the second processed audio being configured for use by the speech recognition module 426.

Figure 9:
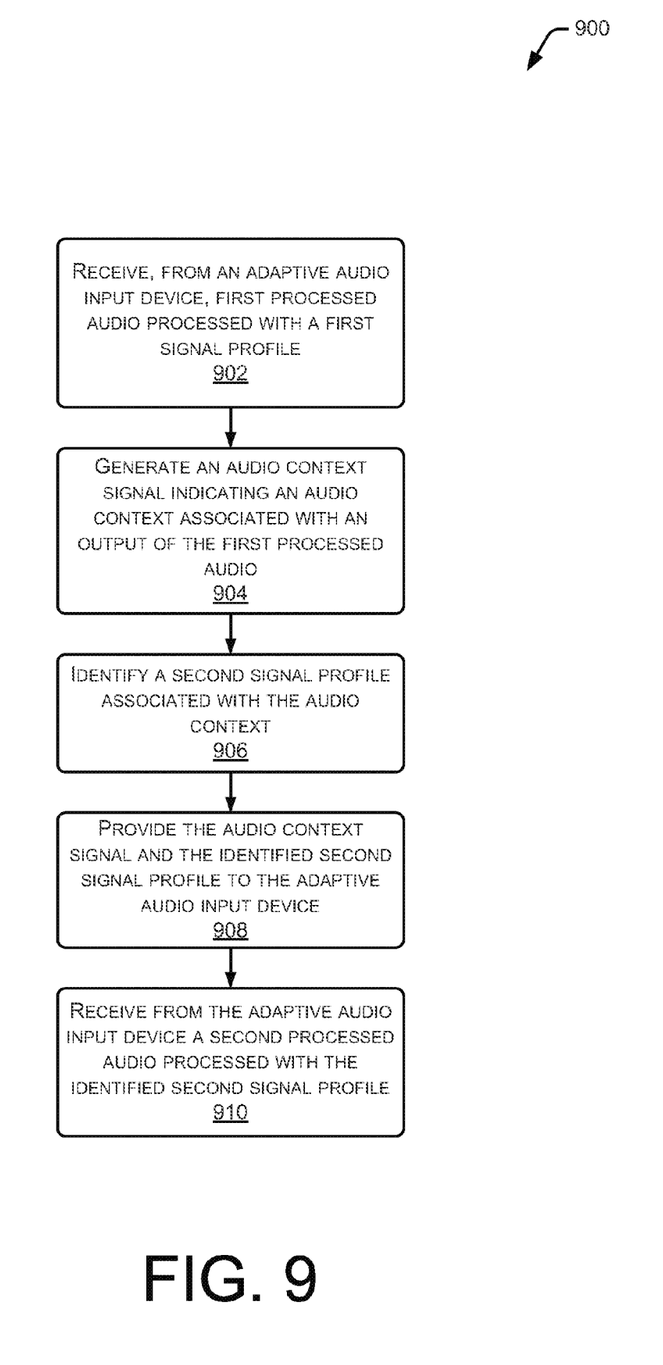
FIG. 9 illustrates a flow diagram of a process of changing signal profiles based at least in part on an interaction between adaptive audio interface devices in accordance with an embodiment of the disclosure.

FIG. 9 illustrates a flow diagram 900 of a process of changing signal profiles based at least in part on an interaction between adaptive audio interface devices. In some implementations, the following process may be implemented by the adaptive audio input device 102, the device 406, or a combination thereof.

Block 902 receives, from an adaptive audio input device, first processed audio processed with a first signal profile. For example, the first processed audio 404(1) may include data indicating the user-to-user signal profile 112(1) was used to generate the processed audio 404(1). In some implementations, the first processed audio may comprise or be associated with an indicator designating the signal profile used in the processing.

Block 904 generates an audio context signal indicating an audio context 124 associated with an output of the first processed audio. For example, the audio context module 422 may determine that the processed audio is in use by the speech recognition module 426 and may generate the audio context data 404(2) which designates the user-to-device audio context 124(3).

Block 906 identifies a second signal profile associated with the audio context 124. For example, the audio context module 422 may be configured to identify the user-to-device signal profile 112(2) as being appropriate given the audio context 124(3). In some implementations, this identification may be based at least in part on changing a destination of the processed audio among modules or devices, changes in the connection used between the audio source 120 and the audio sink 122, or may be received from another device 406. For example, an audio sink 122 device may provide a signal indicating a change in audio context 124.

In some implementations, identifying the second signal profile may be based at least in part upon receiving a user input. For example, the user may activate the control 114, access an application, start a process on the device, and so forth.

Block 908, when the second signal profile differs from the first signal profile, provides the audio context signal and an indication of the identified second signal profile to the adaptive audio input device 102. Continuing the example, the device 406 may send via the I/O interface 410 the audio context data 404(2) and a designation for the user-device signal profile 112(2). In some implementations a configuration file configured to provide the user-to-device signal profile 112(2) when implemented on the signal processor 108 may be sent instead of, or in addition to, the indication. In one implementation, providing the identified second signal profile may comprise sending a referent to the selected second signal profile. For example, the referent designates the user-to-device signal profile 112(2).

In another implementation, providing the identified second signal profile may be configured to implement the identified second signal profile on the adaptive audio input device 102. For example, a file comprising instructions to configure the signal processor 108 may be sent.

Block 910 receives from the adaptive audio input device 102 a second processed audio processed with the identified second signal profile. Continuing the example, the audio signal processing unit 106 has been configured to use the user-to-device signal profile 112(2), and the resulting second processed audio stream is suitable for use by the device, such as the speech recognition module 426.

Figure 10:
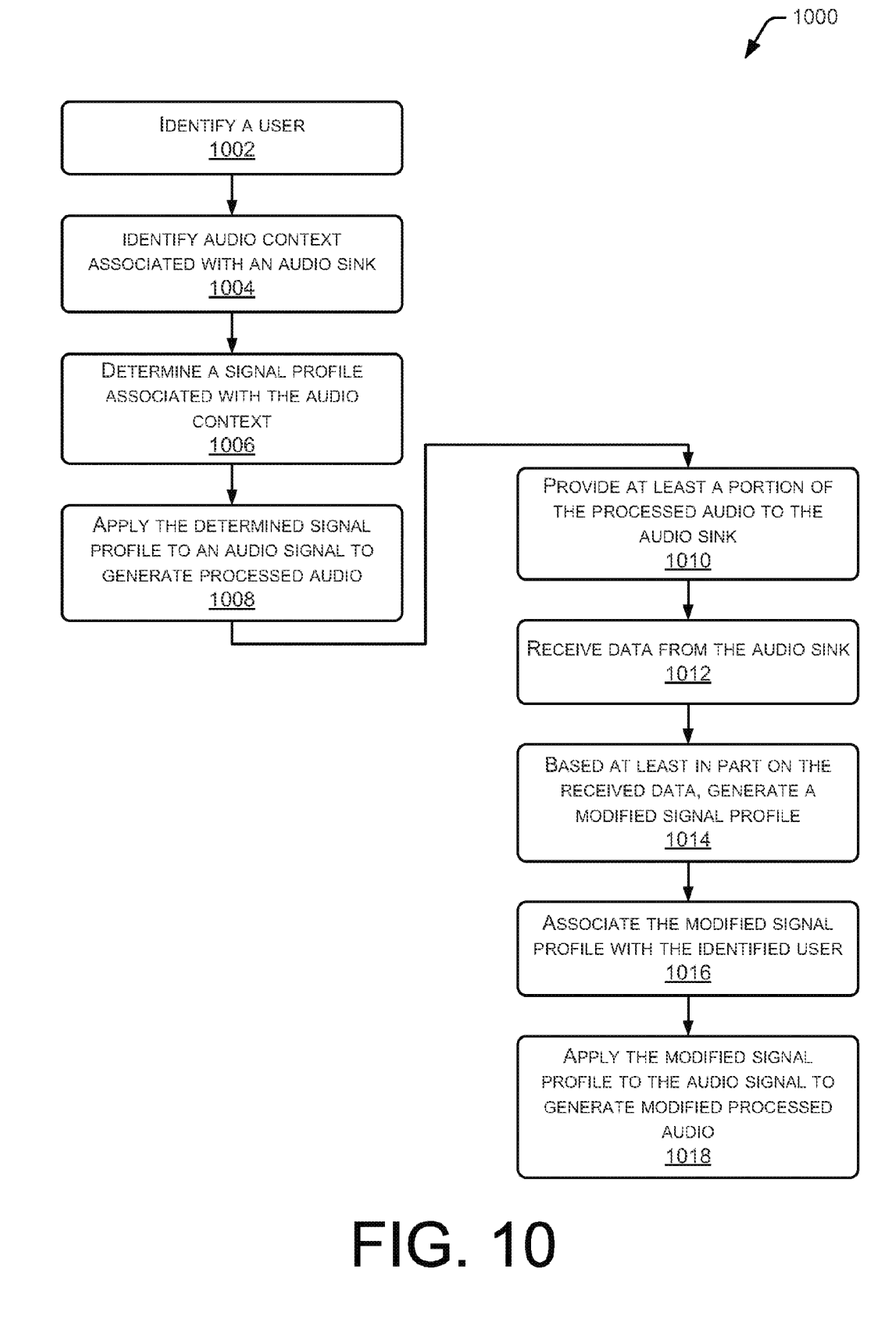
FIG. 10 illustrates a flow diagram of a process of modifying a signal profile associated with a user in accordance with an embodiment of the disclosure.

FIG. 10 illustrates a flow diagram 1000 of a process of modifying a signal profile 112. In some implementations the following process may be implemented by the adaptive audio input device 102, the device 406, or a combination thereof.

During use, it may be determined that modifying a signal profile 112 may provide benefits such as improving intelligibility of the processed audio, reducing bandwidth, lowering power parameters, and so forth. Given different languages, accents, pronunciations, voice pitch, and so forth, the signal profile 112 may be modified for use by a particular user.

Block 1002 identifies a user. In some implementations, identifying the user may comprise receiving a user input. This input may include use of logon credentials such as a user name and password, speech analysis, biometric assessment, accessing a previously stored identification of the user, telephone number, and so forth. For example, the adaptive audio input device 102 may identify a user based at least in part on audio characteristics of the user's speech. The identified user may be the audio source 120 user, or another user who is acting as an audio sink 122(1). In some implementations, the identification may be omitted.

Block 1004 identifies an audio context 124 associated with an audio sink. For example, the signal profile selector 110 may determine that the processed audio stream is for use with the telephony module 424. As described above, when the audio sink 122 comprises a device, the modified signal profile may be configured to increase accuracy of the device during processing of the processed audio stream. In some implementations, the device may be configured to perform speech recognition. For example, the modified signal profile may be configured to improve intelligibility of the speech recognition module 426.

Block 1006 determines a signal profile 112 associated with the audio context 124. For example, the signal profile selector 110 may select the user-to-user signal profile 112(1) as appropriate for the user-to-user (telephone) audio context 124(1).

Block 1008 applies the determined signal profile 112 to an audio signal to generate processed audio. For example, as described above, the sound from the microphone 104 is rendered as processed audio.

Block 1010 provides at least a portion of the processed audio to the audio sink 122. For example, the processed audio may be sent via the wireless PAN interface in the I/O interface 116.

Block 1012 receives data from the audio sink 122. This data may describe one or more changes to the signal profile 112 which are determined to improve intelligibility or effect other changes in the processed audio. For example, where the audio sink 122 is another user 122(1), the user 122(1) may specify amplification of high frequency sounds to accommodate for hearing loss. This data specifying amplification may be sent to the adaptive audio input device 102 used by the audio source 120 user.

Block 1014, based at least in part on the received data, generates a modified signal profile 112. Continuing the example, the signal profile 112 is updated to increase amplification of the high frequency sounds received by the microphone 104. As a result, the processed audio stream is rendered more intelligible by the audio sink 122(1).

Block 1016 associates the modified signal profile with the identified user. For example, the modified signal profile may be associated with the user 122(1). In some implementations, the association may be omitted.

Block 1018 applies the modified signal profile to the audio signal to generate modified processed audio. Continuing the above example, the adaptive audio input device 102 provides processed audio in which the high frequencies are amplified.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatus, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A first device, comprising:
a microphone configured to receive audio and generate an audio signal;
at least one memory storing computer-executable instructions; and
at least one processor configured to access the at least one memory and execute the computer-executable instructions to:
establish a connection with a second device;
receive second device information from the second device;
determine that an end recipient of the audio signal based on the second device information is either the second device or a user of the second device;
select a first signal processing operation if the end recipient of the audio signal is the second device;

select a second signal processing operation if the end recipient of the audio signal is the user of the second device;

perform the selected signal processing operation on the audio signal to generate a processed audio signal; and provide the processed audio signal to the second device.

2. The first device of claim 1, wherein the second device information indicates the second device is a speech recognition device that converts at least a portion of speech to text or commands; and the second device is the end recipient of the audio signal.

3. The first device of claim 1, wherein the second device information indicates the second device provides audio to the user of the second device; and the user of the second device is the end recipient of the audio signal.

4. The first device of claim 1, wherein the second signal processing operation is a noise reduction signal processing operation.

5. A first device comprising:

a microphone configured to receive audio and generate an audio signal;

at least one memory storing computer-executable instructions; and at least one processor configured to access the at least one memory and execute the computer-executable instructions to:

establish a connection with a second device;

determine that an end recipient of the audio signal is either the second device or a user of the second device;

select a first signal processing operation based at least in part on a function of the first device or the second device, a characteristic of the ambient noise, the end recipient of the audio signal, or a combination thereof;

perform the first signal processing operation on the audio signal to generate a processed audio signal; and provide the processed audio signal to the second device.

6. The first device of claim 5, wherein the function of either the first device or the second device is speech recognition.

7. The first device of claim 5, wherein the selection of the first signal processing operation is based at least in part on a level of ambient noise or a type of ambient noise.

8. The first device of claim 7, wherein the at least one processor is further configured to execute the computer-executable instructions to select a second signal processing operation based at least in part on a change in the level or type of ambient noise.

9. The first device of claim 5, wherein the at least one processor is further configured to execute the computer-executable instructions to:

determine a change in the end recipient of the audio signal; and select a third signal processing operation based at least in part on the change in the end recipient of the audio signal.

10. The first device of claim 5, wherein the first signal processing operation comprises one or more of noise cancellation, notch filtering, and echo cancellation.

11. The first device of claim 5, wherein the at least one processor is further configured to execute the computer-executable instructions to:

determine a connection type of the connection between the first device and the second device; and the selection of the first signal processing operation is based at least in part on a characteristic of the connection type.

12. The first device of claim 11, wherein the selection of the first signal processing operation is based at least in part on an available signal bandwidth of the connection type.

13. The first device of claim 11, wherein the connection type is a voice over internet protocol connection type.

14. A first device comprising:

a microphone configured to receive audio and generate an audio signal;

at least one memory storing computer-executable instructions; and at least one processor configured to access the at least one memory and execute the computer-executable instructions to:

establish a connection with a second device;

determine a connection type of the connection between the first device and the second device;

determine that an end recipient of the audio signal is either the second device or a user of the second device;

select a first signal processing operation based at least in part on the connection type;

perform the first signal processing operation on the audio signal to generate a processed audio signal; and provide the processed audio signal to the second device.

15. The first device of claim 14, wherein the at least one processor is further configured to execute the computer-executable instructions to:

determine an available signal bandwidth of the connection type; and select a second signal processing operation based at least in part on a change in the available signal bandwidth.

16. The first device of claim 14, wherein the at least one processor is further configured to execute the computer-executable instructions to select a third signal processing operation based at least in part on a change in the connection type.

17. The first device of claim 14, wherein the connection type is a voice over internet protocol connection type.

18. The first device of claim 14, wherein the at least one processor is further configured to execute the computer-executable instructions to determine a level of ambient noise included in the audio signal.

19. The first device of claim 18, wherein the selection of the first signal processing operation is based at least in part on the level of ambient noise.

20. The first device of claim 18, wherein the first signal processing operation is a noise reduction signal processing operation.

* * * * *